(12) United States Patent
Zhan et al.

(10) Patent No.: US 12,130,831 B2
(45) Date of Patent: Oct. 29, 2024

(54) CLOUD COMPUTING-BASED ADAPTIVE STORAGE LAYERING SYSTEM AND METHOD

(71) Applicant: Kuyun (Shanghai) Information Technology Co., Ltd., Shanghai (CN)

(72) Inventors: Shaoxiong Zhan, Shanghai (CN); Yang Li, Shanghai (CN); Qing Han, Shanghai (CN)

(73) Assignee: KUYUN (SHANGHAI) INFORMATION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/615,551

(22) PCT Filed: Jan. 29, 2021

(86) PCT No.: PCT/CN2021/074308
§ 371 (c)(1),
(2) Date: Nov. 30, 2021

(87) PCT Pub. No.: WO2022/126839
PCT Pub. Date: Jun. 23, 2022

(65) Prior Publication Data
US 2024/0028604 A1    Jan. 25, 2024

(30) Foreign Application Priority Data
Dec. 15, 2020 (CN) .......................... 202011483292.0

(51) Int. Cl.
*G06F 17/00* (2019.01)
*G06F 16/14* (2019.01)
(Continued)

(52) U.S. Cl.
CPC .......... *G06F 16/254* (2019.01); *G06F 16/148* (2019.01); *G06F 16/172* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 10,061,775 B1    8/2018   Tripathi et al.
10,326,845 B1*   6/2019   Jaeger .................. H04L 41/022
(Continued)

FOREIGN PATENT DOCUMENTS

CN    106470219 A    3/2017
CN    108920616 A    11/2018
(Continued)

*Primary Examiner* — Hung D Le
(74) *Attorney, Agent, or Firm* — CANTOR COLBURN LLP (57) ABSTRACT

The disclosure provides a cloud computing-based adaptive storage layering system and method. The system includes a data node management module, a metadata management module, an adaptive storage layering module, and a pre-aggregated query routing module. According to predefined rules, node capacity is expanded and shrunk, collected queried hit models and scanned file paths are aggregated and sorted, and layering loading and pre-loading are performed on files. Based on the disclosure, an efficient On-Line Analytical Processing (OLAP) query execution engine may be constructed, to deal with complex OLAP queries of various reporting system. Therefore, the execution efficiency of cloud OLAP engines can be significantly enhanced.

13 Claims, 2 Drawing Sheets

(51) Int. Cl.
  *G06F 16/172* (2019.01)
  *G06F 16/25* (2019.01)

(56) References Cited

U.S. PATENT DOCUMENTS

| | | | | |
|---|---|---|---|---|
| 10,348,767 | B1* | 7/2019 | Lee | H04L 63/0236 |
| 11,061,868 | B1* | 7/2021 | Popovich | G06F 16/13 |
| 11,514,275 | B2* | 11/2022 | Tiwary | G06N 7/01 |
| 11,754,991 | B2* | 9/2023 | Popp | G05B 19/056 |
| | | | | 700/97 |
| 2008/0313498 | A1* | 12/2008 | Jennings | G06F 16/27 |
| | | | | 714/E11.002 |
| 2016/0335303 | A1* | 11/2016 | Madhalam | G06F 16/2455 |
| 2018/0089328 | A1* | 3/2018 | Bath | G06F 16/9538 |
| 2019/0156519 | A1* | 5/2019 | Mammou | H04N 19/172 |
| 2019/0158605 | A1* | 5/2019 | Markuze | H04L 69/163 |
| 2019/0268421 | A1* | 8/2019 | Markuze | H04L 67/10 |
| 2019/0288956 | A1* | 9/2019 | Pulier | G06F 9/45558 |
| 2019/0327272 | A1* | 10/2019 | Narayanaswamy | G06F 16/285 |
| 2019/0342228 | A1* | 11/2019 | Varma | H04L 47/70 |
| 2019/0379612 | A1* | 12/2019 | Tiwary | H04L 47/2433 |
| 2020/0099772 | A1* | 3/2020 | Ray | H04L 67/34 |
| 2020/0210398 | A1* | 7/2020 | Liu | G06F 16/284 |
| 2020/0213024 | A1* | 7/2020 | O'Gorman | H04Q 11/0062 |
| 2020/0220814 | A1* | 7/2020 | Hazay | H04L 12/4641 |
| 2020/0221473 | A1* | 7/2020 | Krishnaswamy | H04W 72/52 |
| 2020/0235788 | A1* | 7/2020 | Rajagopal | H04B 7/0848 |
| 2020/0322226 | A1* | 10/2020 | Mishra | H04L 43/067 |
| 2020/0344267 | A1* | 10/2020 | Adam | G06F 21/6218 |
| 2020/0382471 | A1* | 12/2020 | Janakiraman | H04L 61/5007 |
| 2021/0051044 | A1* | 2/2021 | Wondra | H04L 12/4633 |
| 2021/0149915 | A1* | 5/2021 | Lee | G06F 16/2282 |
| 2021/0168125 | A1* | 6/2021 | Vemulpali | H04L 9/3226 |
| 2021/0203989 | A1* | 7/2021 | Wang | G06T 9/00 |
| 2021/0241328 | A1* | 8/2021 | Christensen | G06Q 30/0611 |
| 2021/0297494 | A1* | 9/2021 | Kaplan | G06F 9/4881 |
| 2021/0357238 | A1* | 11/2021 | Kirmse | G06F 9/45558 |
| 2022/0066670 | A1* | 3/2022 | Naik | G06F 3/0641 |
| 2022/0091771 | A1* | 3/2022 | Freilich | G06F 3/0604 |
| 2024/0012379 | A1* | 1/2024 | Popp | G05B 19/418 |

FOREIGN PATENT DOCUMENTS

| | | |
|---|---|---|
| CN | 109344092 A | 2/2019 |
| CN | 109947787 A | 6/2019 |
| CN | 110995856 A | 4/2020 |

* cited by examiner

CLOUD COMPUTING-BASED ADAPTIVE STORAGE LAYERING SYSTEM AND METHOD

CROSS REFERENCE TO THE RELATED APPLICATIONS

This application is the national phase entry of International Application No. PCT/CN2021/074308, filed on Jan. 29, 2021, which is based upon and claims priority to Chinese Patent Application No. 202011483292.0, filed on Dec. 15, 2020 the entire contents of which are incorporated herein by reference.

TECHNICAL FIELD

The disclosure relates to the technical field of data analysis, and in particular, to a cloud computing-based adaptive storage layering system and method.

BACKGROUND

In a cloud computing environment, a big data architecture system is often based on a storage and computing separated architecture. The advantages of separating storage and computing are that cost performance of a user for processing big data on the cloud may be greatly enhanced. When an ETL workflow completed, data has been completely saved on cloud storage. In this case, the user can directly shuts down or delete unused machines to release computing resources, thereby reducing cloud costs. Likewise, in case of separation of storage and computing, horizontal expansion or dynamic reduction can be performed on the computing resources according to needs without influencing storage. When the use concurrency of big data is large, horizontal expansion is performed on a cluster to deal with high concurrency requests. After concurrency is reduced, computing nodes are dynamically reduced to lower use costs. However, there are also defects under such an architecture. In case of separation of computing and storage, computing and storage are often transmitted through a network. The rate of transmission depends on a bandwidth. Although cloud infrastructure providers constantly improve network hardware facilities, compared with local storage, storage and computing under a cloud environment are limited by a bandwidth transfer rate, which may usually become a bottleneck of data analysis. In order to accelerate access to cloud storage, on one hand, costs may be weighed to select machines with higher bandwidths as much as possible, so as to relieve performance loss caused by network transmission; and on the other hand, hot data may be cached in a computing cluster to the greatest extent, to achieve rapid response to hot data queries.

Currently, under a cloud computing environment, distributed file cache systems capable of supporting multiple clouds mainly include Alluxio. The distributed file cache systems have advantages to supporting multi-level storage and simultaneously supporting a plurality of public clouds. However, the shortcomings of the distributed file cache systems are also obvious. When there are many files required to be cached, it can only perform cache file replacement according to access conditions. A replacement algorithm is relatively simple, which is not suitable for pre-computing scenes. Elastic expansion is not supported, so that when there are more file required to be cached, automatic expansion cannot usually achieved. In addition, based on the consideration of costs on the cloud, a cluster may be often stopped in idle and started when it is required. In this case, when an On-Line Analytical Processing (OLAP) engine is used to perform initial query, generally, the speed for scanning the files at the initial period of time is very slow as model index files cannot be dynamically preheated. The above is the lack of taking Alluxio as a distributed file cache scheme.

Due to the defects in the current OLAP engine and an Alluxio integration scheme, it is hard to support sub-second query response under high concurrency. Thus, the disclosure projects a cloud computing-based adaptive storage layering scheme, so that the execution efficiency of a cloud OLAP engine can be significantly enhanced.

SUMMARY

In view of the above, the disclosure provides a cloud computing-based adaptive storage layering system and method. The following technical solutions are provided.

On the one hand, the disclosure provides a cloud computing-based adaptive storage layering system. The system includes a data node management module, a metadata management module, an adaptive storage layering module, and a pre-aggregated query routing module. The data node management module is configured to collect storage cluster operation conditions to perform horizontal expansion and shrinkage according to predefined rules. The metadata management module is configured to collect queried hit models and scanned file paths of an OLAP query engine to perform aggregation and sorting on data. The adaptive storage layering module is configured to perform layering loading and pre-loading on files according to a ranking list of model hit counts and file scanning times maintained by the metadata management module. The pre-aggregated query routing module is configured to automatically switch query storage addresses according to cache conditions of models and indexes in a meta-database.

Further, storage cluster operation condition data collected by the data node management module includes capacity of nodes of a storage cluster, used capacity of the nodes of the storage cluster, and cache files and sizes thereof of the nodes of the storage cluster.

Further, a cluster of the data node management module includes a storage cluster and a computing cluster. The storage cluster is mainly used for storing data. The computing cluster is mainly used for providing a computing function. The storage cluster and the computing cluster both have cache functions.

Further, the storage cluster includes the storage of a memory layer (MEN), a Solid State Disk (SSD) layer, and a Hard Disk Drive (HDD) layer.

Further, expansion and shrinkage rules of the data node management module include: performing horizontal expansion on a storage cluster when the cache capacity in the storage cluster is less than 20% of the capacity required by an actual computing cluster; and optimizing data node configuration to shrink the storage cluster when data in the storage cluster expires or is no longer in use.

Further, by being connected to a log system of an OLAP query engine, the metadata management module analyzes queried hit models and scanned file information thereof from log files to store to a meta-database, so as to update a time-order ranking list of a current model and a scanned file thereof.

Further, a layering loading strategy of the adaptive storage layering module includes: classifying files in the list into a very hot layer, a relatively hot layer and a hot layer that correspond to the MEN layer, the SSD layer, and the HDD layer on data nodes to perform storage, and respectively loading the three layers of data to a cache according to pre-configured percentages of layers and storage sizes of the layers in a cluster.

Further, a pre-loading strategy of the adaptive storage layering module includes: after a cluster is restarted each time, pre-loading a part that the layer is defined as very hot in a memory through a command.

Further, a strategy of the pre-aggregated query routing module for automatically switching query storage addresses includes: after a user queries a hit model, querying whether a current model is present in a cache to the metadata management module, if yes, redirecting a loading file request to the cache, and otherwise, performing loading directly to source data.

On the other hand, the disclosure provides a cloud computing-based adaptive storage layering method. The method is applied to the above cloud computing-based adaptive storage layering system. The method includes the following steps.

At step 1, a query request submits a distributed computing task by using a pre-aggregated query routing module.

At step 2, the pre-aggregated query routing module automatically switches query storage addresses according to cache conditions of models and indexes in a meta-database.

At step 3, a metadata management module collects queried hit models and scanned file paths of an OLAP query engine, to aggregate and sort data.

At step 4, an adaptive storage layering module performs layering loading and pre-loading on files according to a ranking list of model hit counts and file scanning times maintained by the metadata management module.

At step 5, a data node management module collects storage cluster operation conditions, to perform horizontal expansion and shrinkage according to predefined rules, wherein step 5 is required to be executed during execution of step 2, step 3 and step 4.

At step 6, a query result is submitted after the metadata management module matches the query result with a query request of the pre-aggregated query routing module.

On the other hand, the disclosure provides a cloud computing-based adaptive storage layering method. The method includes the following operations.

Storage cluster operation conditions are obtained to perform horizontal expansion and shrinkage according to predefined rules.

Queried hit models and scanned file paths of an OLAP query engine are obtained to aggregate and sort the models and the scanned file paths.

Layering loading and pre-loading are performed on files based on a ranking list of model hit counts and file scanning times.

Query storage addresses are automatically switched according to cache conditions of models and indexes in a meta-database.

Further, the operation of obtaining storage cluster operation conditions, to perform horizontal expansion and shrinkage according to the predefined rules includes the following operations.

Any one or more of node capacity information, used node capacity information, node cache file information and node cache file size information in a storage cluster are obtained.

Node adjustment scheme is generated based on the information and the preset rules, and nodes are created and/or destroyed according to the adjustment scheme.

Further, queried hit models and scanned file paths of an OLAP query engine are obtained to aggregate and sort the models and the scanned file paths.

Log files in a log system of the OLAP query engine are extracted. The log files are processed. Queried hit models and scanned file information thereof in the log files are obtained to store to a meta-database.

A time-order ranking list of a current model and a scanned file thereof is updated based on the hit models and the scanned file information thereof at the current moment.

Further, the operation of performing layering loading and pre-loading on files based on a ranking list of model hit counts and file scanning times includes the following operations.

The files are classified into a very hot layer, a relatively hot layer and a hot layer based on the preset rules.

The very hot layer, the relatively hot layer and the hot layer correspond to an MEN layer, an SSS layer and an HDD layer to perform storage.

Data stored in the MEN layer, the SSS layer and the HDD layer is loaded into a cache according to pre-configured percentages of layers and storage sizes of the layers in a cluster.

Further, the operation of automatically switching query storage addresses according to cache conditions of models and indexes in a meta-database includes the following operations.

Whether a current hit model is present in a cache is determined when a user queries a hit model.

If yes, files are directing loaded to a cache data cluster to obtain a corresponding model; and if no, loading is performed directly to source data.

On the other hand, the disclosure provides a cloud computing-based adaptive storage layering device. The device includes a data node management module, a metadata management module, an adaptive storage layering module, and a pre-aggregated query routing module.

The data node management module is configured to obtain storage cluster operation conditions, to perform horizontal expansion and shrinkage according to predefined rules.

The metadata management module is configured to obtain queried hit models and scanned file paths of an OLAP query engine, and aggregate and sort the models and the scanned file paths.

The adaptive storage layering module is configured to perform layering loading and pre-loading on files based on a ranking list of model hit counts and file scanning times.

The pre-aggregated query routing module is configured to automatically switch query storage addresses according to cache conditions of models and indexes in a meta-database.

On the other hand, the disclosure provides a readable storage medium. The readable storage medium stores a computer program. The method is implemented when the computer program is performed by a processor.

On the other hand, the disclosure provides a readable storage medium. The readable storage medium includes at least one processor and a memorizer in communication connection with the at least one processor. The memorizer stores a computer program capable of being performed by the at least one processor. The computer program is performed by the at least one processor, to cause the at least one processor to perform the above method.

The disclosure provides a cloud computing-based adaptive storage layering system and method. By providing a performance optimization scheme of network transmission when an OLAP engine loads pre-computing content, the data volume of network transmission between object storage and the OLAP engine can be greatly reduced. Distributed cache based on the horizontal expansion and automatic shrinkage of capacity is provided, so that the throughput capacity of a distributed cache system can be greatly increased, and the use cost of a user can be reduced. A preheating scheme of the distributed cache system during initialization is provided, and by combining the characteristics of an OLAP query engine, query performance can be greatly improved.

BRIEF DESCRIPTION OF THE DRAWINGS

The accompanying drawings described herein are used to provide a further understanding of this application, constitute a part of this application, so that other features, objectives and advantages of this application become more obvious. The exemplary embodiments of this application and the description thereof are used to explain this application, but do not constitute improper limitations to this application. In the drawings.

DETAILED DESCRIPTION OF THE EMBODIMENTS

In order to enable those skilled in the art to better understand the solutions of this application, the technical solutions in the embodiments of this application will be clearly and completely described below in combination with the drawings in the embodiments of this application. It is apparent that the described embodiments are only part of the embodiments of this application, not all the embodiments. All other embodiments obtained by those of ordinary skill in the art on the basis of the embodiments in this application without creative work shall fall within the scope of protection of this application.

It is to be noted that terms "first", "second" and the like in the description, claims and the above mentioned drawings of this application are used for distinguishing similar objects rather than describing a specific sequence or a precedence order. It should be understood that the data used in such a way may be exchanged where appropriate, in order that the embodiments of this application described here can be implemented. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

In this application, orientation or position relationships indicated by terms "upper", "lower", "left", "right", "front", "back", "top", "bottom", "inside", "outside" "in", "vertical", "horizontal", "transverse", "longitudinal" and the like are orientation or position relationships shown in the drawings. These terms are mainly used to better describe this application and its embodiments, rather than limit that the indicated devices, components and constituting parts must be in specific orientations or structured and operated in the specific orientations.

Furthermore, the above mentioned part of terms may be not only used to represent the orientation or position relationships, but used to represent other meanings, for example, term "on" may be used to represent certain relationship of dependence or connection relationship in some cases. For those of ordinary skill in the art, specific meanings of these terms in this application may be understood according to a specific condition.

In addition, the term "a plurality of" shall refer to two or more than two. It is to be noted that the embodiments in this application and the features in the embodiments may be combined with one another without conflict. The disclosure will now be described below in detail with reference to the drawings and the embodiments.

Embodiment I

Figure 1:
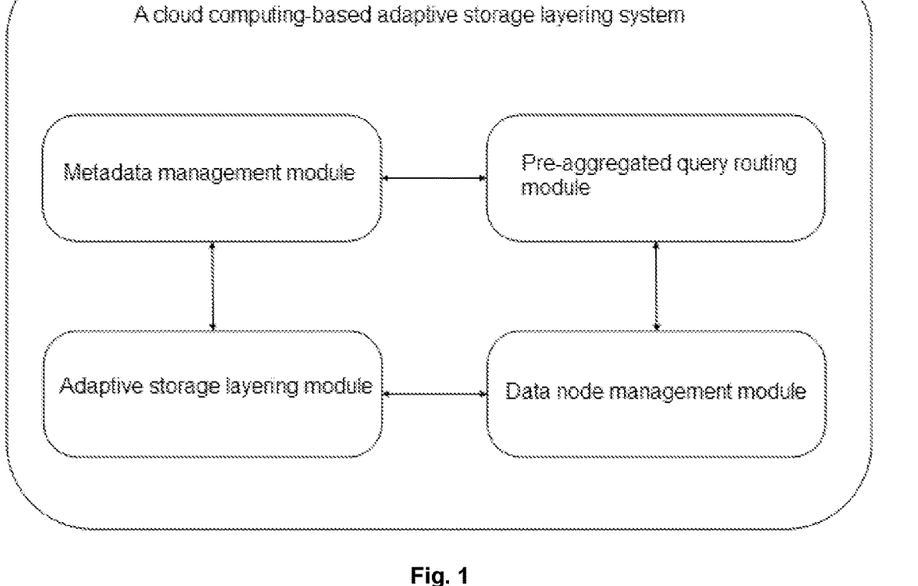
FIG. 1 is a schematic diagram of a cloud computing-based adaptive storage layering system according to the disclosure.

Embodiment I of the disclosure provides a cloud computing-based adaptive storage layering system. As shown in FIG. 1, the system includes a data node management module, a metadata management module, an adaptive storage layering module, and a pre-aggregated query routing module. The data node management module is configured to collect storage cluster operation conditions to perform horizontal expansion and shrinkage according to predefined rules. The metadata management module is configured to collect queried hit models and scanned file paths of an OLAP query engine to perform aggregation and sorting on data. The adaptive storage layering module is configured to perform layering loading and pre-loading on files according to a ranking list of model hit counts and file scanning times maintained by the metadata management module. The pre-aggregated query routing module is configured to automatically switch query storage addresses according to cache conditions of models and indexes in a meta-database.

Storage cluster operation condition data collected by the data node management module includes capacity of nodes of a storage cluster, used capacity of the nodes of the storage cluster, and cache files and sizes thereof of the nodes of the storage cluster.

A cluster of the data node management module includes a storage cluster and a computing cluster. The storage cluster is mainly used for storing data. The computing cluster is mainly used for providing a computing function. The storage cluster and the computing cluster both have cache functions.

The storage cluster includes the storage of an MEN layer, an SSD layer, and an HDD layer.

Expansion and shrinkage rules of the data node management module include: performing horizontal expansion on a storage cluster when the cache capacity in the storage cluster is less than the capacity required by an actual computing cluster; and optimizing data node configuration to shrink the storage cluster when data in the storage cluster expires or is no longer in use.

During specific implementation, the data node management module firstly collects information, such as node capacity, used node capacity, node cache files and sizes. Then, according to predefined expansion and shrinkage rules, horizontal expansion is performed on a storage cluster when the cache capacity in the storage cluster is less than the capacity required by an actual computing cluster. Data node configuration is optimized to shrink the storage cluster when data in the storage cluster expires or is no longer in use. A set of node expansion or shrinkage plans is generated.

Finally, actual node creation and destroying operations are performed according to the node expansion or shrinkage plans. According to the disclosure, distributed cache based on the horizontal expansion and automatic shrinkage of capacity is provided, so that the throughput capacity of a distributed cache system can be greatly increased, and the use cost of a user can be reduced.

During specific implementation, the metadata management module is firstly connected to a log system of an OLAP query engine. Then, queried hit models and scanned file information thereof are analyzed from log files to store to a meta-database, to update a time-order ranking list of a current model and a scanned file thereof. A current OLAP model hit count ranking list and a file scanning time ranking list are maintained, to prepare for an adaptive storage layering module. By providing a performance optimization scheme of network transmission when an OLAP engine loads pre-computing content, the data volume of network transmission between object storage and the OLAP engine can be greatly reduced.

A layering loading strategy of the adaptive storage layering module includes: classifying files in the list into a very hot layer, a relatively hot layer and a hot layer that correspond to the MEN layer, the SSD layer, and the HDD layer on data nodes to perform storage, and respectively loading the three layers of data to a cache according to pre-configured percentages of layers and storage sizes of the layers in a cluster. A pre-loading strategy of the adaptive storage layering module includes: after a cluster is restarted each time, pre-loading a part that the layer is defined as very hot in a memory through a command. The disclosure provides a preheating scheme of a distributed cache system during initialization. By combining the characteristics of the OLAP query engine, query performance is greatly enhanced. Therefore, a performance problem of large query data volume is resolved.

Further, a strategy of the pre-aggregated query routing module for automatically switching query storage addresses includes: after a user queries a hit model, querying whether a current model is present in a cache to the metadata management module, if yes, redirecting a loading file request to the cache, and otherwise, performing loading directly to source data to support the dynamic switching of loading files from different data sources, thereby ensuring that each query can be responded with the fastest speed.

Embodiment II

Figure 2:
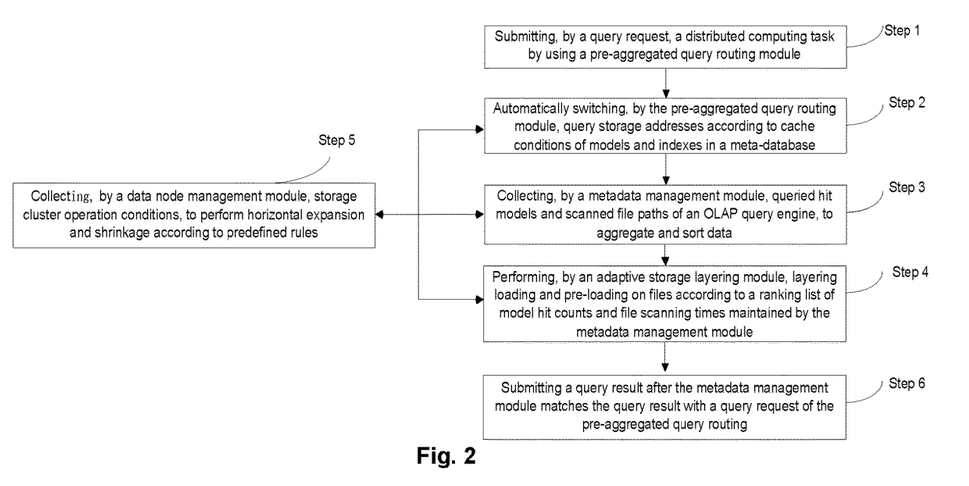
FIG. 2 is a schematic diagram of a cloud computing-based adaptive storage layering method according to the disclosure.

Embodiment II of the disclosure provides a cloud computing-based adaptive storage layering method. The method is applied to the above cloud computing-based adaptive storage layering system. As shown in FIG. 2, the method includes the following steps.

At step 1, a query request submits a distributed computing task by using a pre-aggregated query routing module.

At step 2, the pre-aggregated query routing module automatically switches query storage addresses according to cache conditions of models and indexes in a meta-database.

During specific implementation, after a user queries a hit model, whether a current model is present in a cache is firstly queried to the metadata management module. If yes, a loading file request is redirected to the cache, and otherwise, loading is performed directly to source data.

At step 3, a metadata management module collects queried hit models and scanned file paths of an OLAP query engine, to aggregate and sort data.

During specific implementation, firstly, a log system of an OLAP query engine is connected. Then, queried hit models and scanned file information thereof are analyzed from log files to store to a meta-database. Finally, a time-order ranking list of a current model and a scanned file thereof is updated.

At step 4, an adaptive storage layering module performs layering loading and pre-loading on files according to a ranking list of model hit counts and file scanning times maintained by the metadata management module.

With respect to layering loading, firstly, files in the list are classified into a very hot layer, a relatively hot layer and a hot layer that correspond to the MEN layer, the SSD layer, and the HDD layer on data nodes to perform storage. Then, the three layers of data are respectively loaded to a cache according to pre-configured percentages of layers and storage sizes of the layers in a cluster. With respect to pre-loading, after a cluster is restarted each time, a part that the layer is defined as very hot is preloaded in a memory through a command.

At step 5, a data node management module collects storage cluster operation conditions, to perform horizontal expansion and shrinkage according to predefined rules, wherein step 5 is required to be executed during execution of step 2, step 3 and step 4.

Horizontal expansion is performed on a storage cluster when the cache capacity in the storage cluster is less than 20% of the capacity required by an actual computing cluster. Data node configuration is optimized to shrink the storage cluster when data in the storage cluster expires or is no longer in use.

At step 6, a query result is submitted after the metadata management module matches the query result with a query request of the pre-aggregated query routing module.

Embodiment III

Figure 3:
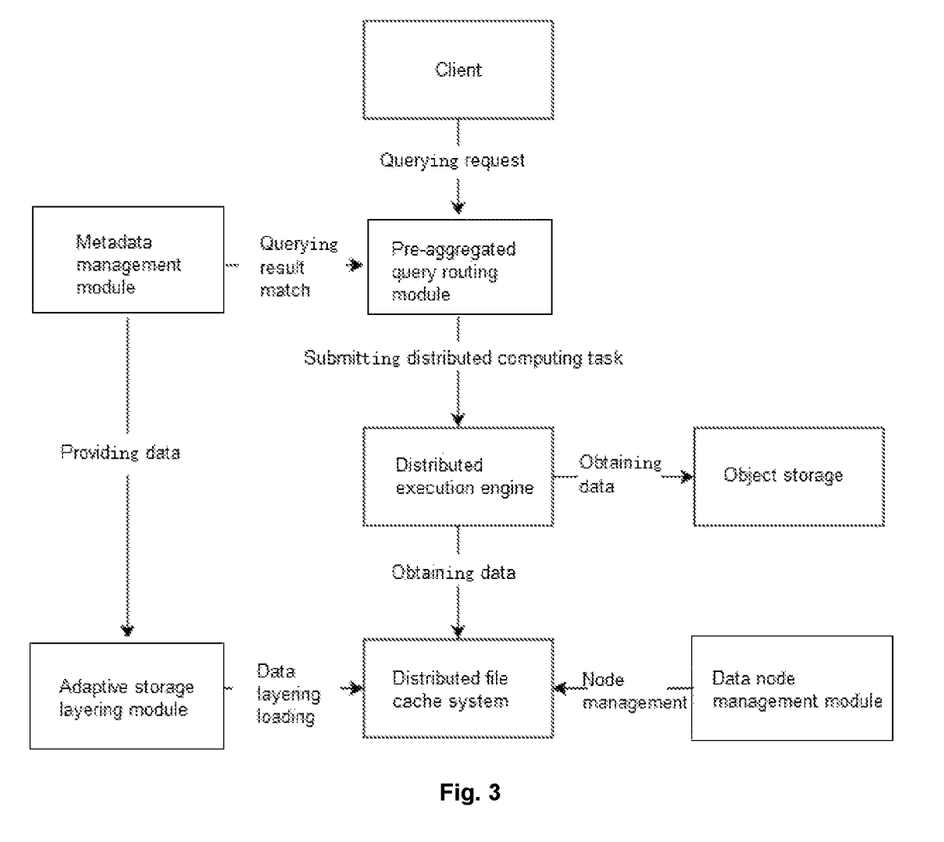
FIG. 3 is a schematic flowchart of an entire scheme according to specific embodiments of the disclosure.

A specific embodiment of the disclosure provides a cloud computing-based adaptive storage layering system. The flow of an entire scheme is shown in FIG. 3. During specific implementation, a query request is submitted by a client terminal. A distributed computing task is submitted by using a pre-aggregated query routing module. After a user queries a hit model, whether a current model is present in a cache is firstly queried to a metadata management module. If yes, a loading file request is redirected to the cache, and a distributed execution engine obtains data from a distributed file cache system and may directly obtain the data from object storage. Otherwise, the distributed execution engine directly obtains the data from object storage. A data node management module collects storage cluster operation conditions to perform horizontal expansion and shrinkage according to predefined rules. The metadata management module collects queried hit models and scanned file paths of an OLAP query engine to perform aggregation and sorting on the data. A current OLAP model hit count ranking list and a file scanning time ranking list are maintained, to prepare for an adaptive storage layering module. The adaptive storage layering module performs layering loading and pre-loading on files according to a ranking list of model hit counts and file scanning times maintained by the metadata management module. A query result is submitted after the metadata management module matches the query result with a query request of the pre-aggregated query routing module.

Embodiment IV

The disclosure provides a cloud computing-based adaptive storage layering method. The method includes the following operations.

Storage cluster operation conditions are obtained to perform horizontal expansion and shrinkage according to pre-defined rules.

Queried hit models and scanned file paths of an OLAP query engine are obtained to aggregate and sort the models and the scanned file paths.

Layering loading and pre-loading are performed on files based on a ranking list of model hit counts and file scanning times.

Query storage addresses are automatically switched according to cache conditions of models and indexes in a meta-database.

In an embodiment, the operation of obtaining storage cluster operation conditions, to perform horizontal expansion and shrinkage according to the predefined rules includes the following operations.

Any one or more of node capacity information, used node capacity information, node cache file information and node cache file size information in a storage cluster are obtained.

Node adjustment scheme is generated based on the information and the preset rules, and nodes are created and/or destroyed according to the adjustment scheme.

Firstly, information, such as node capacity, used node capacity, node cache files and sizes are collected. Then, according to predefined rules, a set of node expansion or shrinkage plans is generated. Finally, actual node creation and destroying operations are performed according to the node expansion or shrinkage plans. This module is mainly intended to perform horizontal expansion on a storage cluster when the cache capacity in the storage cluster is less than the capacity required by an actual computing cluster. In addition, data node configuration is optimized to shrink the storage cluster when data in the storage cluster expires or is no longer in use.

In an embodiment, queried hit models and scanned file paths of an OLAP query engine are obtained to aggregate and sort the models and the scanned file paths.

Log files in a log system of the OLAP query engine are extracted. The log files are processed. Queried hit models and scanned file information thereof in the log files are obtained to store to a meta-database.

A time-order ranking list of a current model and a scanned file thereof is updated based on the hit models and the scanned file information thereof at the current moment.

Firstly, a log system of an OLAP query engine is connected. Then, queried hit models and scanned file information thereof are analyzed from log files to store to a meta-database. Finally, a time-order ranking list of a current model and a scanned file thereof is updated. This module is mainly intended to maintain a current OLAP model hit count ranking list and a file scanning time ranking list are maintained, to prepare for an adaptive storage layering module.

In an embodiment, the operation of performing layering loading and pre-loading on files based on a ranking list of model hit counts and file scanning times includes the following operations.

The files are classified into a very hot layer, a relatively hot layer and a hot layer based on the preset rules.

The very hot layer, the relatively hot layer and the hot layer correspond to an MEN layer, an SSS layer and an HDD layer to perform storage.

Data stored in the MEN layer, the SSS layer and the HDD layer is loaded into a cache according to pre-configured percentages of layers and storage sizes of the layers in a cluster.

With respect to layering loading, firstly, files in the list are classified into a very hot layer, a relatively hot layer and a hot layer that correspond to the MEN layer, the SSD layer, and the HDD layer on data nodes to perform storage. Then, the three layers of data are respectively loaded to a cache according to pre-configured percentages of layers and storage sizes of the layers in a cluster. With respect to pre-loading, after a cluster is restarted each time, a part that the layer is defined as very hot is preloaded in a memory through a command. This module is mainly to resolve a performance problem of large query data volume.

In an embodiment, the operation of automatically switching query storage addresses according to cache conditions of models and indexes in a meta-database includes the following operations.

Whether a current hit model is present in a cache is determined when a user queries a hit model.

If yes, files are directing loaded to a cache data cluster to obtain a corresponding model; and if no, loading is performed directly to source data.

After a user queries a hit model, whether a current model is present in a cache is firstly queried to the metadata management module. If yes, a loading file request is redirected to a cache data cluster, and otherwise, loading is performed directly to source data. This module is mainly intended to support the dynamic switching of loading files from different data sources.

Embodiment V

The disclosure provides a cloud computing-based adaptive storage layering device. The device includes a data node management module, a metadata management module, an adaptive storage layering module, and a pre-aggregated query routing module.

The data node management module is configured to obtain storage cluster operation conditions, to perform horizontal expansion and shrinkage according to predefined rules.

The metadata management module is configured to obtain queried hit models and scanned file paths of an OLAP query engine, and aggregate and sort the models and the scanned file paths.

The adaptive storage layering module is configured to perform layering loading and pre-loading on files based on a ranking list of model hit counts and file scanning times.

The pre-aggregated query routing module is configured to automatically switch query storage addresses according to cache conditions of models and indexes in a meta-database.

This scheme mainly consists of four modules, which are the data node management module, the metadata management module, the adaptive storage layering module, and the pre-aggregated query routing module. The four modules are specifically introduced below.

The data node management module is mainly configured to collect data cluster operation conditions, to perform horizontal expansion and shrinkage according to predefined rules. Firstly, information, such as node capacity, used node capacity, node cache files and sizes are collected. Then, according to predefined rules, a set of node expansion or shrinkage plans is generated. Finally, actual node creation and destroying operations are performed according to the node expansion or shrinkage plans. This module is mainly intended to perform horizontal expansion on a storage cluster when the cache capacity in the storage cluster is less than the capacity required by an actual computing cluster. In addition, data node configuration is optimized to shrink the storage cluster when data in the storage cluster expires or is no longer in use.

The metadata management module is mainly configured to collect queried hit models and scanned file paths of an OLAP query engine, to aggregate and sort data. Firstly, a log system of an OLAP query engine is connected. Then, queried hit models and scanned file information thereof are analyzed from log files to store to a meta-database. Finally, a time-order ranking list of a current model and a scanned file thereof is updated. This module is mainly intended to maintain a current OLAP model hit count ranking list and a file scanning time ranking list are maintained, to prepare for an adaptive storage layering module.

The adaptive storage layering module is mainly configured to perform layering loading and pre-loading on files according to a ranking list of model hit counts and file scanning times maintained by the metadata management module. With respect to layering loading, firstly, files in the list are classified into a very hot layer, a relatively hot layer and a hot layer that correspond to the MEN layer, the SSD layer, and the HDD layer on data nodes to perform storage. Then, the three layers of data are respectively loaded to a cache according to pre-configured percentages of layers and storage sizes of the layers in a cluster. With respect to pre-loading, after a cluster is restarted each time, a part that the layer is defined as very hot is preloaded in a memory through a command. This module is mainly to resolve a performance problem of large query data volume.

The pre-aggregated query routing module is mainly configured to automatically switch query storage addresses according to cache conditions of models and indexes in a meta-database, so as to ensure that each query can be responded with the fastest speed. After a user queries a hit model, whether a current model is present in a cache is firstly queried to the metadata management module. If yes, a loading file request is redirected to a cache data cluster, and otherwise, loading is performed directly to source data. This module is mainly intended to support the dynamic switching of loading files from different data sources.

In a specific embodiment of the disclosure, the query performance of Alluxio used as a distributed cache scheme in the prior art in a cloud computing environment under a conventional reporting system and the query performance of an adaptive storage layering scheme of the disclosure under the conventional reporting system are tested. According to comparison results, the query speed of the adaptive storage layering scheme is generally 2-5 times faster than that of the distributed cache scheme.

The above are only the preferred embodiments of this application and are not intended to limit this application. For those skilled in the art, this application may have various modifications and variations. Any modifications, equivalent replacements, improvements and the like made within the spirit and principle of this application shall fall within the scope of protection of this application.

What is claimed is:

1. A cloud computing-based adaptive storage layering system, comprising a data node management module, a metadata management module, an adaptive storage layering module, and a pre-aggregated query routing module, wherein the data node management module is configured to collect storage cluster operation conditions to perform horizontal expansion and shrinkage according to predefined rules, the metadata management module is configured to collect queried hit models and scanned file paths of an On-Line Analytical Processing (OLAP) query engine to perform aggregation and sorting on data, the adaptive storage layering module is configured to perform layering loading and pre-loading on files according to a ranking list of model hit counts and file scanning times maintained by the metadata management module, and the pre-aggregated query routing module is configured to automatically switch query storage addresses according to cache conditions of models and indexes in a meta-database, wherein storage cluster operation condition data collected by the data node management module comprises capacity of nodes of a storage cluster, used capacity of the nodes of the storage cluster, and cache files and sizes thereof of the nodes of the storage cluster.

2. The cloud computing-based adaptive storage layering system as claimed in claim 1, wherein a cluster of the data node management module comprises a storage cluster and a computing cluster, the storage cluster is mainly used for storing data, the computing cluster is mainly used for providing a computing function, and the storage cluster and the computing cluster both have cache functions.

3. The cloud computing-based adaptive storage layering system as claimed in claim 2, wherein the storage cluster comprises the storage of a memory layer (MEN), a solid state disk (SSD) layer, and a hard disk drive (HDD) layer.

4. The cloud computing-based adaptive storage layering system as claimed in claim 1, wherein expansion and shrinkage rules of the data node management module comprise: performing horizontal expansion on a storage cluster when the cache capacity in the storage cluster is less than 20% of the capacity required by an actual computing cluster; optimizing data node configuration to shrink the storage cluster when data in the storage cluster expires or is no longer in use.

5. The cloud computing-based adaptive storage layering system as claimed in claim 1, wherein by being connected to a log system of an OLAP query engine, the metadata management module analyzes queried hit models and scanned file information thereof from log files to store to a meta-database, so as to update a time-order ranking list of a current model and a scanned file thereof.

6. The cloud computing-based adaptive storage layering system as claimed in claim 1, wherein a layering loading strategy of the adaptive storage layering module comprises: classifying files in the list into a very hot layer, a relatively hot layer and a hot layer that correspond to an MEN layer, an SSD layer, and an HDD layer on data nodes to perform storage, and respectively loading the three layers of data to a cache according to pre-configured percentages of layers and storage sizes of the layers in a cluster.

7. The cloud computing-based adaptive storage layering system as claimed in claim 1, wherein a pre-loading strategy of the adaptive storage layering module comprises: after a cluster is restarted each time, pre-loading a part that the layer is defined as very hot in a memory through a command.

8. The cloud computing-based adaptive storage layering system as claimed in claim 1, wherein a strategy of the pre-aggregated query routing module for automatically switching query storage addresses comprises: after a user queries a hit model, querying whether a current model is present in a cache to the metadata management module, if yes, redirecting a loading file request to the cache, and otherwise, performing loading directly to source data.

9. A cloud computing-based adaptive storage layering method, wherein the method is applied to the cloud computing-based adaptive storage layering system as claimed in claim 1, and comprises the following steps:

step 1: submitting, by a query request, a distributed computing task by using a pre-aggregated query routing module;

step 2: automatically switching, by the pre-aggregated query routing module, query storage addresses according to cache conditions of models and indexes in a meta-database;

step 3: collecting, by a metadata management module, queried hit models and scanned file paths of an OLAP query engine, to aggregate and sort data;

step 4: performing, by an adaptive storage layering module, layering loading and pre-loading on files according to a ranking list of model hit counts and file scanning times maintained by the metadata management module;

step 5: collecting, by a data node management module, storage cluster operation conditions, to perform horizontal expansion and shrinkage according to predefined rules, wherein step 5 is required to be executed during execution of step 2, step 3 and step 4; and step 6: submitting a query result after the metadata management module matches the query result with a query request of the pre-aggregated query routing module.

10. A cloud computing-based adaptive storage layering method, comprising:
   obtaining storage cluster operation conditions, to perform horizontal expansion and shrinkage according to predefined rules;
   obtaining queried hit models and scanned file paths of an OLAP query engine, to aggregate and sort the models and the scanned file paths;
   performing layering loading and pre-loading on files based on a ranking list of model hit counts and file scanning times; and
   automatically switching query storage addresses according to cache conditions of models and indexes in a meta-database,
   wherein that obtaining storage cluster operation conditions, to perform horizontal expansion and shrinkage according to the predefined rules comprises:
   obtaining any one or more of node capacity information, used node capacity information, node cache file information and node cache file size information in a storage cluster; and
   generating node adjustment scheme based on the information and the preset rules, and creating and/or destroying nodes according to the adjustment scheme.

11. A cloud computing-based adaptive storage layering method as claimed in claim 10, wherein the method comprises:
   obtaining queried hit models and scanned file paths of an OLAP query engine, to aggregate and sort the models and the scanned file paths;
   extracting log files in a log system of the OLAP query engine, processing the log files, and obtaining queried hit models and scanned file information thereof in the log files to store to a meta-database; and
   updating a time-order ranking list of a current model and a scanned file thereof based on the hit models and the scanned file information thereof at the current moment.

12. A cloud computing-based adaptive storage layering method as claimed in claim 10, wherein that performing layering loading and pre-loading on files based on a ranking list of model hit counts and file scanning times comprises:
   classifying the files into a very hot layer, a relatively hot layer and a hot layer based on the preset rules;
   corresponding the very hot layer, the relatively hot layer and the Hot layer to an MEN layer, an SSS layer and an HDD layer to perform storage; and
   respectively loading data stored in the MEN layer, the SSS layer and the HDD layer into a cache according to pre-configured percentages of layers and storage sizes of the layers in a cluster.

13. A cloud computing-based adaptive storage layering method as claimed in claim 10, wherein
   that automatically switching query storage addresses according to cache conditions of models and indexes in a meta-database comprises:
   determining whether a current hit model is present in a cache when a user queries a hit model;
   if yes, directing loading files to a cache data cluster to obtain a corresponding model; and
   if no, performing loading directly to source data.

* * * * *